(12) United States Patent
Nakaoka

(10) Patent No.: US 10,142,571 B2
(45) Date of Patent: Nov. 27, 2018

(54) IMAGE CAPTURING APPARATUS, METHOD FOR CONTROLLING THE SAME, IMAGE PROCESSING APPARATUS, AND IMAGE PROCESSING METHOD

(71) Applicant: CANON KABUSHIKI KAISHA, Tokyo (JP)

(72) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/485,510

(22) Filed: Apr. 12, 2017

(65) Prior Publication Data

US 2017/0310912 A1    Oct. 26, 2017

(30) Foreign Application Priority Data

Apr. 21, 2016 (JP) ................. 2016-085430

(51) Int. Cl.
*H04N 5/361* (2011.01)
*H04N 5/378* (2011.01)
*H04N 5/369* (2011.01)
*H04N 5/351* (2011.01)

(52) U.S. Cl.
CPC ............. *H04N 5/361* (2013.01); *H04N 5/351* (2013.01); *H04N 5/3696* (2013.01); *H04N 5/378* (2013.01)

(58) Field of Classification Search
CPC ........ H04N 5/361; H04N 5/351; H04N 5/378; H04N 5/3696
See application file for complete search history.

(56) References Cited

U.S. PATENT DOCUMENTS

| | | | |
|---|---|---|---|
| 6,933,978 B1* | 8/2005 | Suda | G02B 7/34 348/345 |
| 8,749,697 B2* | 6/2014 | Sakaida | H04N 5/23212 348/350 |
| 9,055,244 B2* | 6/2015 | Nishihara | H04N 5/32 |
| 2013/0057754 A1* | 3/2013 | Shimada | H04N 5/35581 348/362 |
| 2014/0125861 A1* | 5/2014 | Sugie | H04N 5/23212 348/349 |
| 2014/0327744 A1* | 11/2014 | Gotoh | H04N 13/0022 348/49 |
| 2017/0310908 A1* | 10/2017 | Hatakeyama | H04N 5/3456 |

FOREIGN PATENT DOCUMENTS

JP    2001-124984 A    5/2001

* cited by examiner

*Primary Examiner* — Padma Haliyur
(74) *Attorney, Agent, or Firm* — Fitzpatrick, Cella, Harper & Scinto

(57) ABSTRACT

An image capturing apparatus comprises an image sensor including a plurality of photoelectric conversion portions for each of a plurality of microlenses, performs readout control using one of a first readout method of reading out a plurality of image signals from the plurality of photoelectric conversion portions corresponding to each of the microlenses, and a second readout method of reading out an added image signal from the plurality of photoelectric conversion portions corresponding to each of the microlenses, determines whether an image signal is read out using the first readout method or the second readout method, adds the plurality of image signals read out using the first readout method, and adjusts the added image signal obtained through the addition by an increased amount of the black level that has increased due to the addition as an adjustment value.

17 Claims, 13 Drawing Sheets

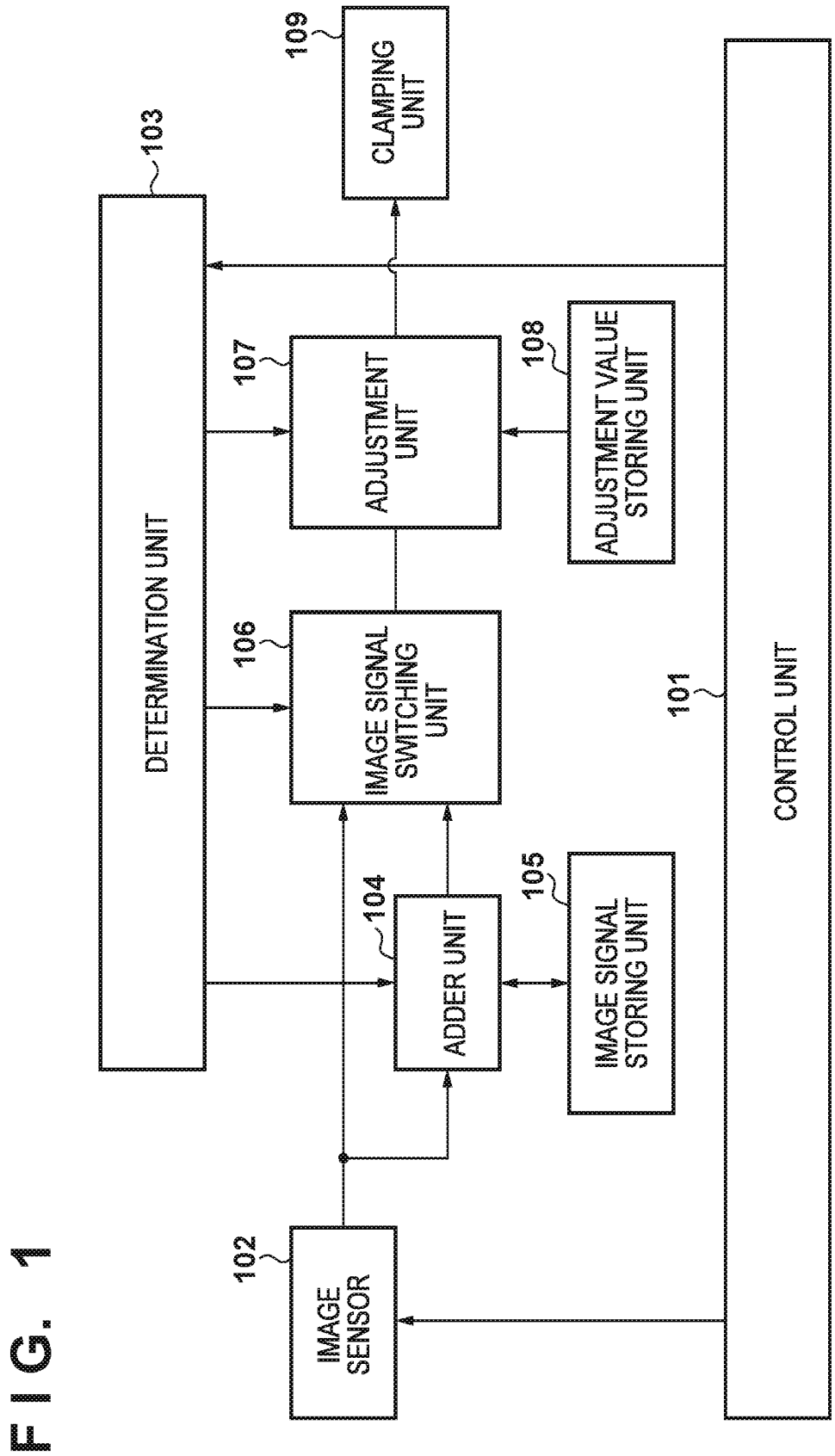

FIG. 3

| | | | | | | | | |
|---|---|---|---|---|---|---|---|---|
| Line0 | P00 | P01 | P02 | P03 | P04 | P05 | P06 | P07 | ~301
| Line1 | P10 | P11 | P12 | P13 | P14 | P15 | P16 | P17 |
| Line2 | A20 | A21 | A22 | A23 | A24 | A25 | A26 | A27 | ~302
| Line3 | B30 | B31 | B32 | B33 | B34 | B35 | B36 | B37 | ~303
| Line4 | P40 | P41 | P42 | P43 | P44 | P45 | P46 | P47 |
| Line5 | P50 | P51 | P52 | P53 | P54 | P55 | P56 | P57 |
| Line6 | A60 | A61 | A62 | A63 | A64 | A65 | A66 | A67 |
| Line7 | B70 | B71 | B72 | B73 | B74 | B75 | B76 | B77 |

FIG. 6

| LINE | BLACK LEVEL | AFTER ADDITION |
|---|---|---|
| Line0 | X | X |
| Line1 | X | X |
| Line2 | X | (X+Y) |
| Line3 | Y | |
| Line4 | X | X |
| Line5 | X | X |
| Line6 | X | (X+Y) |
| Line7 | Y | |

IMAGE CAPTURING APPARATUS, METHOD FOR CONTROLLING THE SAME, IMAGE PROCESSING APPARATUS, AND IMAGE PROCESSING METHOD

BACKGROUND OF THE INVENTION

Field of the Invention

The present invention relates to an image capturing apparatus, a method for controlling the same, an image processing apparatus, and an image processing method, and relates in particular to an image capturing apparatus, a method for controlling the same, an image processing apparatus, and an image processing method for adjusting the black level of an image signal captured using an image sensor.

Description of the Related Art

Conventionally, in some kinds of image capturing apparatuses that use a condensing optical system and an image sensor, a photoelectric conversion portion in each pixel portion provided below a condensing microlens that is formed on the image sensor is divided into a plurality of portions, and images obtained by dividing an exit pupil in the condensing optical system are acquired as image signals. Japanese Patent Laid-Open No. 2001-124984 discloses a technique for detecting focus based on image signals that include images obtained by dividing an exit pupil.

With the above-described configuration of conventional image sensors, image signals are independently acquired from a plurality of photoelectric conversion portions in every pixel portion, and therefore, a problem arises in that the number of pixels to be read out from an image sensor increases. For this reason, there is a proposed method in which signals are independently read out from a plurality of photoelectric conversion portions in only lines that belong to an area for detecting focus on the image sensor (focus detection area), whereas, in lines that do not belong to the focus detection area, signals from the plurality of photoelectric conversion portions are added together in the pixel portions and are then output. It is conceivable to thus reduce the number of pixels to be read out in the image sensor. This configuration enables focus detection to be performed using the image signals in the lines that are independently read out from among the image signals obtained from the image sensor, and also enables an image signal for recording to be generated by adding together the image signals.

However, employment of the above configuration causes a new problem. The signal level at the time when the amount of incident light is zero differs among the lines that have been read out due to a readout operation for the image signals from the image sensor, which may degrade the accuracy of black level adjustment processing and may further be a factor in the deterioration of image quality of the image signal to be recorded.

SUMMARY OF THE INVENTION

The present invention has been made in consideration of the above situation, and accurately corrects a difference in the black level between an added signal obtained by reading out image signals from a plurality of photoelectric conversion portions in each pixel and adding together those image signals, and an image signal obtained by adding together the image signals of the plurality of photoelectric conversion portions within each pixel and thereafter reading out the added signal.

According to the present invention, provided is an image capturing apparatus comprising: an image sensor including a plurality of photoelectric conversion portions for each of a plurality of microlenses; a readout control circuitry that performs readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal; a determination circuitry that determines whether an image signal read out from the image sensor has been read out using the first readout method or the second readout method, and outputs a determination result; an adder that adds the plurality of image signals that have been read out using the first readout method, based on the determination result provided by the determination circuitry; and an adjusting circuitry that adjusts the added image signal obtained through the addition by an increased amount of the black level that has increased due to the addition performed by the adder as an adjustment value.

Further, according to the present invention, provided is a method for controlling an image capturing apparatus having an image sensor including a plurality of photoelectric conversion portions for each of a plurality of microlenses, the method comprising: performing readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal; determining whether an image signal read out from the image sensor has been read out using the first readout method or the second readout method, and outputting a determination result; adding the plurality of image signals that have been read out using the first readout method, based on the determination result provided during the determining; and adjusting the added image signal obtained through the adding by an increased amount of the black level that has increased due to the addition as an adjustment value.

Furthermore, according to the present invention, provided is an image processing apparatus that processes an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the image processing apparatus comprising: a determination circuitry that determines, based on appended information that is appended to the image signal, whether the image signal has been read out using the first readout method or has been read out using the second readout method, and outputs a determination result; an adder that adds the plurality of image signals that have been read out using the first readout method, based on the determination result provided by the determination circuitry; and an adjusting circuitry that adjusts the added image signal obtained through the addition by an increased amount of the black level that has increased due to the addition performed by the adder as an adjustment value.

Further, according to the present invention, provided is an image processing method for processing an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the method comprising: determining, based on appended information that is appended to the image signal, whether the image signal has been read out using the first readout method or has been read out using the second readout method, and outputting a determination result; adding the plurality of image signals that have been read out using the first readout method, based on the determination result provided during the determining; and adjusting the added image signal obtained through the adding by an increased amount of the black level that has increased due to the addition as an adjustment value.

Further, according to the present invention, provided is a computer-readable storage medium storing a program for causing a computer to execute a method for controlling an image capturing apparatus having an image sensor including a plurality of photoelectric conversion portions for each of a plurality of microlenses, the method comprising: performing readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal; determining whether an image signal read out from the image sensor has been read out using the first readout method or the second readout method, and outputting a determination result; adding the plurality of image signals that have been read out using the first readout method, based on the determination result provided during the determining; and adjusting the added image signal obtained through the adding by an increased amount of the black level that has increased due to the addition as an adjustment value.

Further, according to the present invention, provided is a computer-readable storage medium storing a program for causing a computer to execute an image processing method for processing an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the method comprising: determining, based on appended information that is appended to the image signal, whether the image signal has been read out using the first readout method or has been read out using the second readout method, and outputting a determination result; adding the plurality of image signals that have been read out using the first readout method, based on the determination result provided during the determining; and adjusting the added image signal obtained through the adding by an increased amount of the black level that has increased due to the addition as an adjustment value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a schematic configuration of an image capturing apparatus according to a first embodiment of the present invention;

FIG. 3 is a schematic diagram showing an example of some read image signals;

FIG. 6 is a diagram showing the black level obtained before and after image signal addition processing according to the first embodiment;

DESCRIPTION OF THE EMBODIMENTS

Figure 2A:
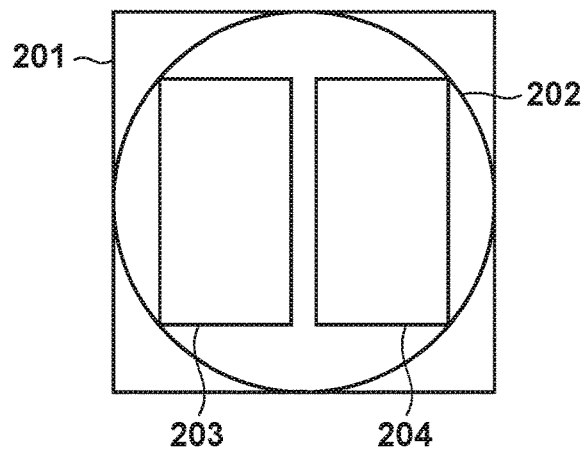
FIGS. 2A and 2B respectively are a conceptual diagram and a circuit diagram showing an exemplary configuration of a unit pixel that constitutes an image sensor according to the first embodiment.

Exemplary embodiments of the present invention will be described in detail in accordance with the accompanying drawings.

First Embodiment

FIG. 1 is a block diagram showing a schematic configuration of an image capturing apparatus according to the first embodiment of the present invention. A control unit 101 is for controlling the entire image capturing apparatus, and generates control signals for controlling operations of an image sensor 102 and a determination unit 103. The image sensor 102 converts an object image into an electrical signal through photoelectric conversion and outputs the electrical signal obtained by conversion as an image signal in accordance with a control signal from the control unit 101.

The determination unit 103 outputs a determination signal to an adder unit 104, an image signal switching unit 106, and an adjustment unit 107, which will be described later, in accordance with a control signal from the control unit 101. Note that the determination signal will be described later. The adder unit 104 adds together image signals of each line obtained from the image sensor 102 based on the determination signal from the determination unit 103, and outputs the added image signal. An image signal storing unit 105 is used for storing image signals during addition processing in the adder unit 104. The image signal switching unit 106 outputs image signals while switching between an image signal output from the image sensor 102 and an image signal obtained through addition performed by the adder unit 104 in accordance with the determination signal from the determination unit 103.

The adjustment unit 107 adjusts the signal level of the image signals output from the image signal switching unit 106 in accordance with the determination signal from the determination unit 103. An adjustment value storing unit 108 stores an adjustment value for adjusting the signal level in the adjustment unit 107. A clamping unit 109 matches the signal level of image signals output from the adjustment unit 107 to that at the time when no image is formed, i.e. when the amount of incident light is zero (hereinafter referred to as "black level").

Figure 2B:
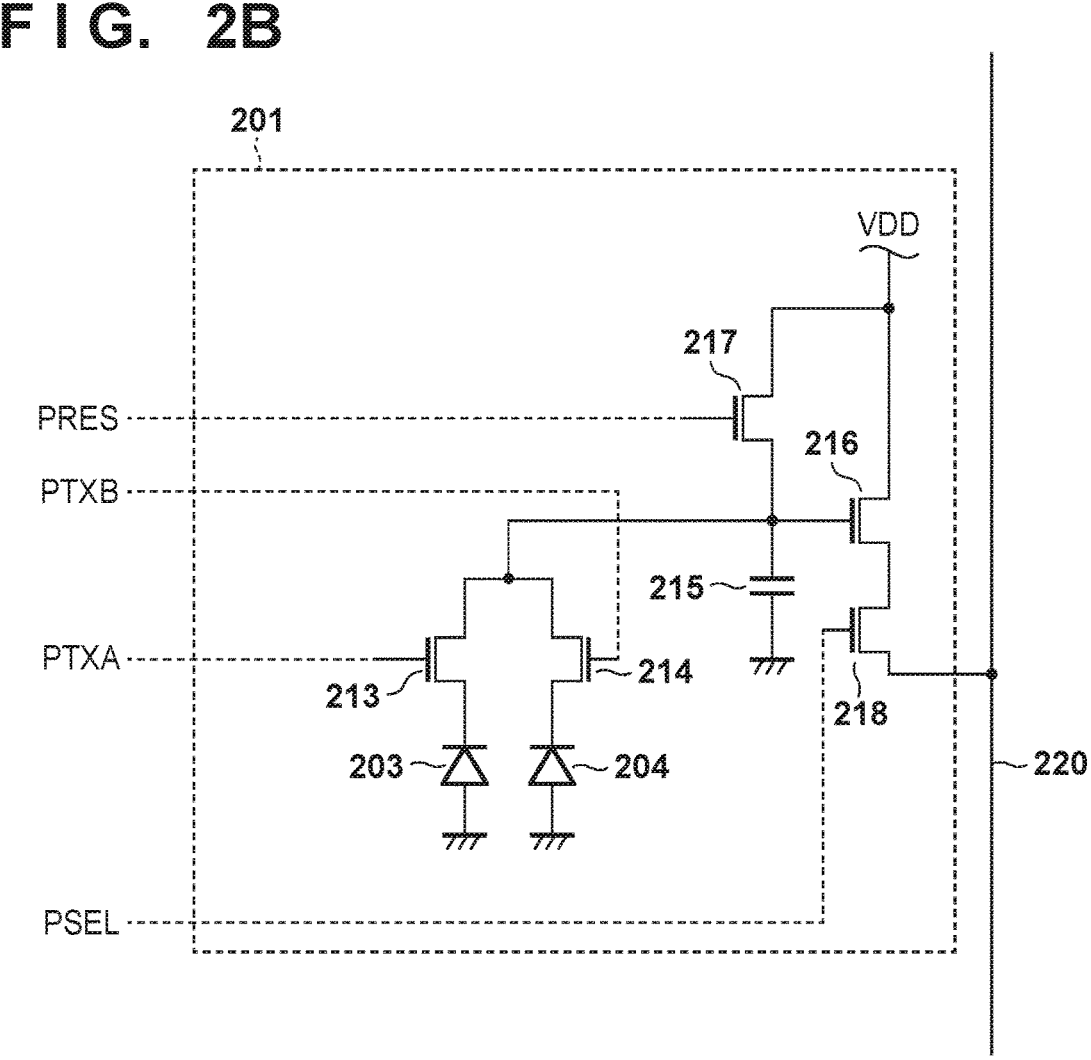

Next, pixels that constitute the image sensor 102 will be described with reference to FIGS. 2A and 2B. FIG. 2A is a schematic diagram showing an exemplary configuration of one unit pixel 201 among a plurality of pixels that constitute the image sensor 102. Each unit pixel 201 has one microlens 202 and a plurality of photoelectric conversion portions, which are typified by photodiodes for converting incident light into a charge. FIGS. 2A and 2B show an example in which two photoelectric conversion portions 203 and 204 are provided.

FIG. 2B is an equivalent circuit diagram of the unit pixel 201. The photoelectric conversion portions 203 and 204 receive light that has passed through the same microlens 202, and generate a charge that corresponds to the amount of received light. Transfer switches 213 and 214 are connected to the photoelectric conversion portions 203 and 204, which are controlled by transfer pulses PTXA and PTXB, respectively. When the transfer switch 213 turns on, the charge generated by the photoelectric conversion portion 203 is transferred to a floating diffusion portion (FD) 215, and when the transfer switch 214 turns on, the charge generated by the photoelectric conversion portion 204 is transferred to the FD 215. The FD 215 thus serves as an accumulation area for temporarily accumulating the charges generated by the photoelectric conversion portions 203 and 204.

That is to say, only the charge of the photoelectric conversion portion 203 can be read out to the FD 215 by turning on only the transfer switch 213, and only the charge of the photoelectric conversion portion 204 can be read out to the FD 215 by turning on only the transfer switch 214 (first readout method). Also, the charges of the photoelectric conversion portion 203 and the photoelectric conversion portion 204 can be added together in the FD 215 by simultaneously turning on the transfer switches 213 and 214 (second readout method). The aforementioned determination signal output by the determination unit 103 is a signal indicating the result of determination as to whether an image signal has been read out using the first readout method or the second readout method.

A reset switch 217 is controlled by a reset pulse PRES, and resets, when turned on, the FD 215 to a reference potential VDD that is supplied from a power supply line (not shown). In addition, the photoelectric conversion portions 203 and 204 can be reset to the reference potential VDD by simultaneously turning on the reset switch 217 and the transfer switches 213 and 214.

A MOS amplifier 216 is also connected to the power supply line (not shown), functions as a source follower amplifier, amplifies a voltage signal based on the charges held by the FD 215, and outputs the amplified voltage signal as an image signal. A selection switch 218 is controlled by a control signal PSEL, and outputs, when turned on, the image signal that has been amplified by the MOS amplifier 216 to a vertical output line 220.

The aforementioned transfer pulses PTXA and PTXB, the reset pulse PRES, and the control signal PSEL are output from a vertical scan circuit (not shown) that is provided in the image sensor 102.

A plurality of unit pixels 201 having the above configuration are arranged in a matrix in the image sensor 102, and are read out row-by-row. Read image signals are sequentially output from the image sensor 102 via vertical output lines 220. Note that a configuration may also be employed in which an obtained image signal is subjected to analog-digital conversion in the image sensor 102 and is output as a digital signal. In this case, an analog-digital conversion portion is provided for each vertical output line 220, and the image signal is output as a digital signal.

FIG. 3 is a schematic diagram showing an example of some of the image signals that have been read out from the image sensor 102, and shows image signals for eight columns arranged in the horizontal direction and eight rows, namely Line0 to Line7, arranged in the vertical direction. Note that each Line does not necessarily correspond to a row of the unit pixels in the image sensor, and if the charges of the photoelectric conversion portions 203 and 204 are independently read out using the first readout method, signals for one line of the unit pixels 201 are image signals for two Lines. A configuration may also be employed in which the charge of the photoelectric conversion portion 203 is read out in one unit pixel row, and the charge of the photoelectric conversion portion 204 is read out in the next unit pixel row, using the first readout method.

P00 to P07 in image signals 301 in Line0 denote image signals in the case of reading out the charges of the photoelectric conversion portions 203 and the photoelectric conversion portions 204 in the unit pixels 201 using the second readout method. Hereinafter, all image signals with the prefix "P" denote image signals that have been read out using the second readout method. A20 to A27 in image signals 302 in Line2 denote image signals obtained by reading out the charges of only the photoelectric conversion portions 203 in the unit pixels 201 using the first readout method, and hereinafter, all image signals with the prefix "A" denote image signals that have been read out using the same method. B30 to B37 in image signals 303 in Line3 denote image signals obtained by reading out the charges of only the photoelectric conversion portions 204 in the unit pixels 201 using the first readout method, and hereinafter, all pixels with the prefix "B" denote image signals that have been read out using the same method. The image sensor 102 can change, row-by-row, whether to use the first readout method or the second readout method to read out the electrical signals obtained through conversion performed by the plurality of photoelectric conversion portions 203 and 204 that constitute each unit pixel 201, in accordance with a control signal from the control unit 101.

Next, processing according to the first embodiment will be described with reference to the flowchart in FIG. 4.

Initially, in step S101, image signals are read out from the image sensor 102. Here, the control unit 101 transmits a control signal row-by-row to the image sensor 102 so as to read out the charges corresponding to an image formed on the photoelectric conversion portions in the image sensor 102 using the first readout method or the second readout method. The image sensor 102 reads out the charges in accordance with the control signal, and outputs the read charges as image signals.

Next, in step S102, the adder unit 104 adds together the image signals in accordance with a determination signal from the determination unit 103. Processing performed in step S102 will now be described.

Figure 5:
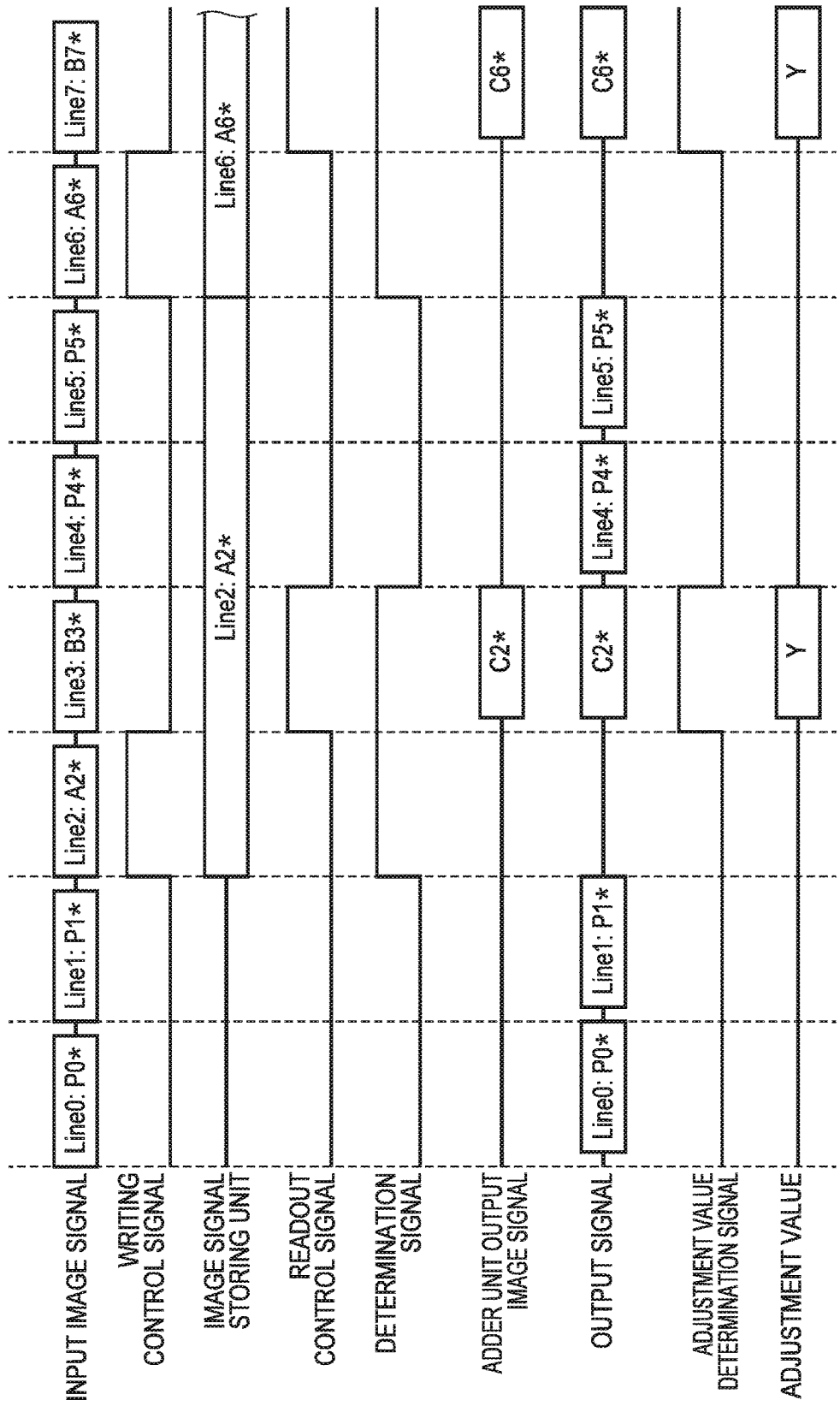
FIG. 5 is a timing chart showing timings of addition processing and switching of adjustment values according to the first embodiment.

FIG. 5 is a timing chart showing timings of processing to add together the image signals in the adder unit 104, and corresponds, here, to the case of reading out signals as shown in FIG. 3, as an example. In FIG. 5, input image signals are the image signals in the respective lines, namely Line0 to Line7, that are output from the image sensor 102. Line2 and Line3, as well as Line6 and Line7 are lines in which the charge of one of the plurality of photoelectric conversion portions 203 and 204 that constitute each unit pixel 201 is read out as an image signal, and accordingly, addition processing needs to be performed to record the read charge as an image signal. A writing control signal is used to control whether to temporarily hold image signals for one line in the image signal storing unit 105, and is generated by the adder unit 104. Signals in the image signal storing unit indicate a state where image signals for one line are stored in the image signal storing unit 105, and when the writing control signal level is Hi (high), an input image signal at that time is stored in the image signal storing unit 105.

A readout control signal is a control signal for controlling readout of the image signals for one line held in the image signal storing unit 105, and is generated by the adder unit 104. The addition processing performed in the adder unit 104 is enabled while the level of the determination signal from the determination unit 103 indicates the first readout method (here, while the determination signal level is Hi). In accordance with this determination signal, the adder unit 104 generates an image signal for recording by adding together Line2 and Line3, and adding together Line6 and Line7. Adder unit output image signals each indicates a generated image signal. In the example of the image signals shown in FIG. 3, the signals in Line2 and Line3 are added together for each unit pixel, and therefore, processing is repeated for addition between A20 and B30, addition between A21 and B31, and so on, to newly obtain image signals (C2*) for one line.

Note that the aforementioned writing control signal and readout control signal are generated based on the aforementioned determination signal by the adder unit 104. For example, the writing control signal and the readout control signal are generated by setting the writing control signal level to Hi for a line for which the determination signal level has been switched from Lo (low) to Hi, and setting the readout control signal level to Hi for a line for which the writing control signal level has been switched from Hi to Lo.

Next, in step S103, the image signal switching unit 106 switches an output signal. Output signals in FIG. 5 indicate image signals that are output from the image signal switching unit 106, and image signals are output while switching between an image signal obtained from the image sensor 102 and an image signal obtained from the adder unit 104, based on the determination signal sent from the determination unit 103. Thus, image signals that are necessary to record an image are output from the image signal switching unit 106.

In step S104, the adjustment unit 107 adjusts the signal level of the image signal. FIG. 6 shows an example of the black levels of the image signals read out from the image sensor 102, and the black levels of the image signals after being added by the adder unit 104. The black level of image signals is determined based on a reset operation of the FD 215 that is performed before the charges are read out from the photoelectric conversion portions 203 and 204; however, it is known that the black level of image signals varies if a difference occurs in the reset operation of the FD 215. For example, when the readout of Line0 is compared with the readout of Line3 in FIG. 3, in the readout of Line0, the FD 215 is in a reset state for a long period of time before the charges are read out from the photoelectric conversion portions 203 and 204 until the readout starts. On the other hand, in the readout of Line3, the FD 215 is reset immediately after the readout of Line2, and the charge of the photoelectric conversion portion 204 is then read out using the FD 215 again. For this reason, the period of time in which the FD 215 is in a reset state tends to be short.

Due to such a difference in the reset state of the FD 215, a difference occurs in the black level when the FD 215 is reset, and lines with different black levels are present among the output image signals. FIG. 6 shows an example of that case, where the image signals with a black level Y that is different from the black level of the other lines are output in Line3 and Line7. In the other lines, the image signals are output with a black level X. Furthermore, when corresponding lines are added together by the adder unit 104, the post-addition black level is the sum of the pre-addition black levels of the added lines, i.e. is (X+Y).

Figure 7:
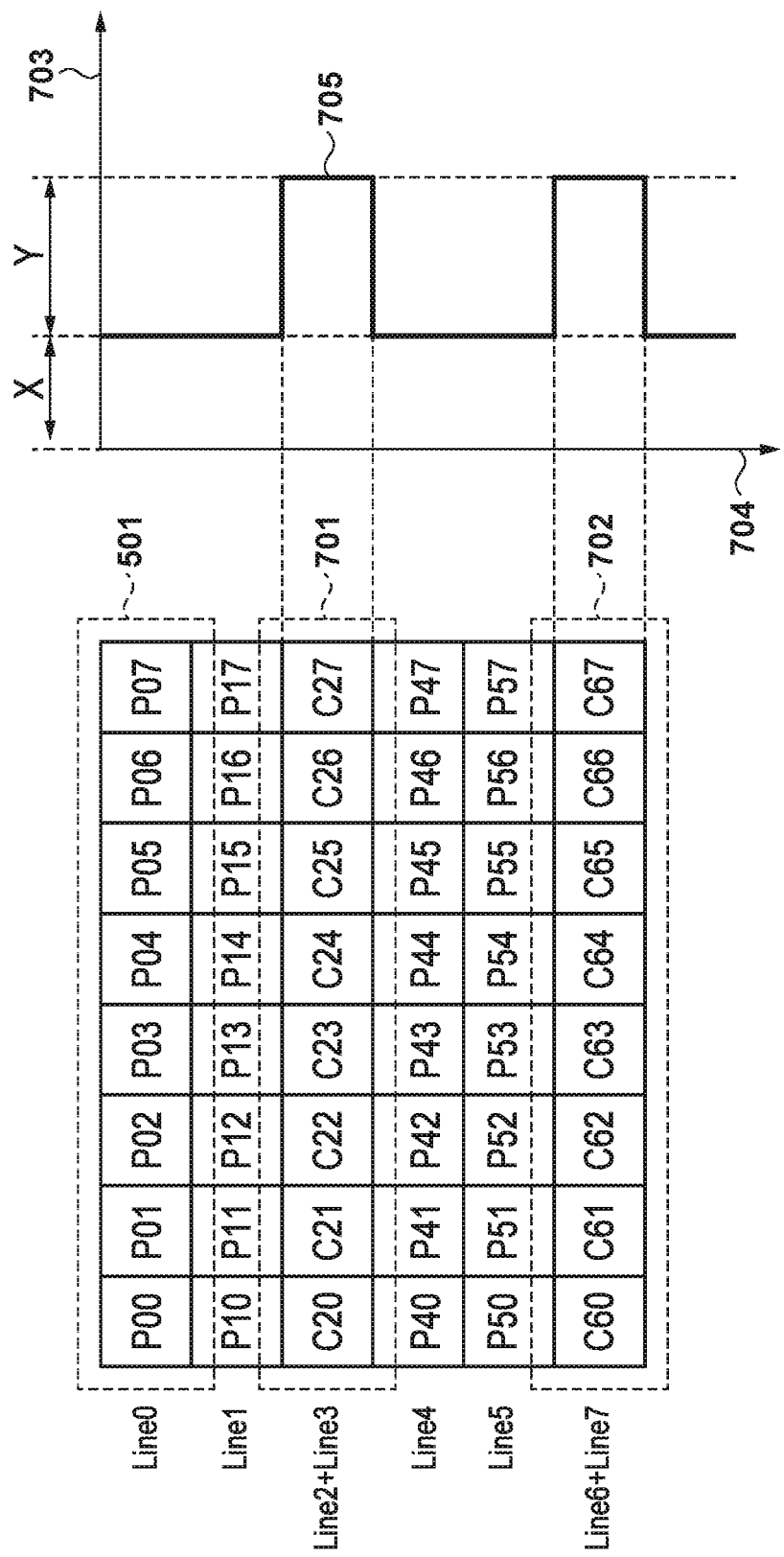
FIG. 7 is a schematic diagram showing the black level obtained after image signal addition processing according to the first embodiment.

FIG. 7 shows the signal levels of the post-addition image signals. Note that a description of the same signs as those shown in FIG. 3 will be omitted. C20 to C27 in image signals 701 denote image signals obtained when Line2 and Line3 were added together, and are post-addition image signals (C2* in FIG. 5) that are output from the adder unit 104. C60 to C67 in image signals 702 are image signals that are output from the adder unit 104 when Line6 and Line7 are added together, similar to the image signals 701. The black levels of the image signals in the respective lines at this time are schematically indicated by 705. 703 indicates the average signal level of the black levels of the respective lines, and 704 indicates the line position. The black level differs between the lines that are added by the adder unit 104 and the lines that are not added by the adder unit 104.

Typically, the black level of each line is adjusted based on the signal level of an image signal that is output from an optical black (OB) area (which is an area provided with a light shield layer made of metal or the like above the photoelectric conversion portions configured in the image sensor 102), the OB area being provided at the left or right end of each line. However, since the number of pixels that can be provided at the left end or the right end is limited, normally, the black level is detected by performing filtering processing over multiple lines and is thus corrected. As is clear from FIG. 7, however, if the black level differs among the lines, a problem arises in that filtering processing cannot be performed over multiple lines. Therefore, in this embodiment, the adjustment unit 107 adjusts only the increased amount of the black level in the added lines.

FIG. 5 also shows timings of adjusting the black level in the adjustment unit 107. To determine that an image signal is obtained as a result of addition performed by the adder unit 104, the determination unit 103 sends an adjustment value determination signal to the adjustment unit 107. The adjustment unit 107 selects an adjustment value in accordance with the adjustment value determination signal. Adjustment values are obtained in advance by performing numerical processing on the image signals from the image sensor 102, then recorded in the adjustment value storing unit 108, and are read out in accordance with the adjustment value determination signal. As is clear from FIG. 7, the adjustment value Y is subtracted from the input image signal so as to subtract the black level Y therefrom with respect to the lines that have been added together by the adder unit 104.

In step S105, the clamping unit 109 clamps the image signal output from the adjustment unit 107 at a target value based on the black level of the image signal. In the system of the image capturing apparatus, the code values to be used as the black level in internal calculation processing are predetermined. Therefore, the black level is detected by performing arithmetic mean processing on the image signals in the aforementioned OB area, and the signal level of the image signal is clamped so as to render the black level a target code value.

As described above, according to the first embodiment, the accuracy of the black level adjustment through clamping processing can be improved by adjusting the black level of only the added lines such that the black level thereof is equal to the black level of the lines that are not added.

Second Embodiment

Figure 8:
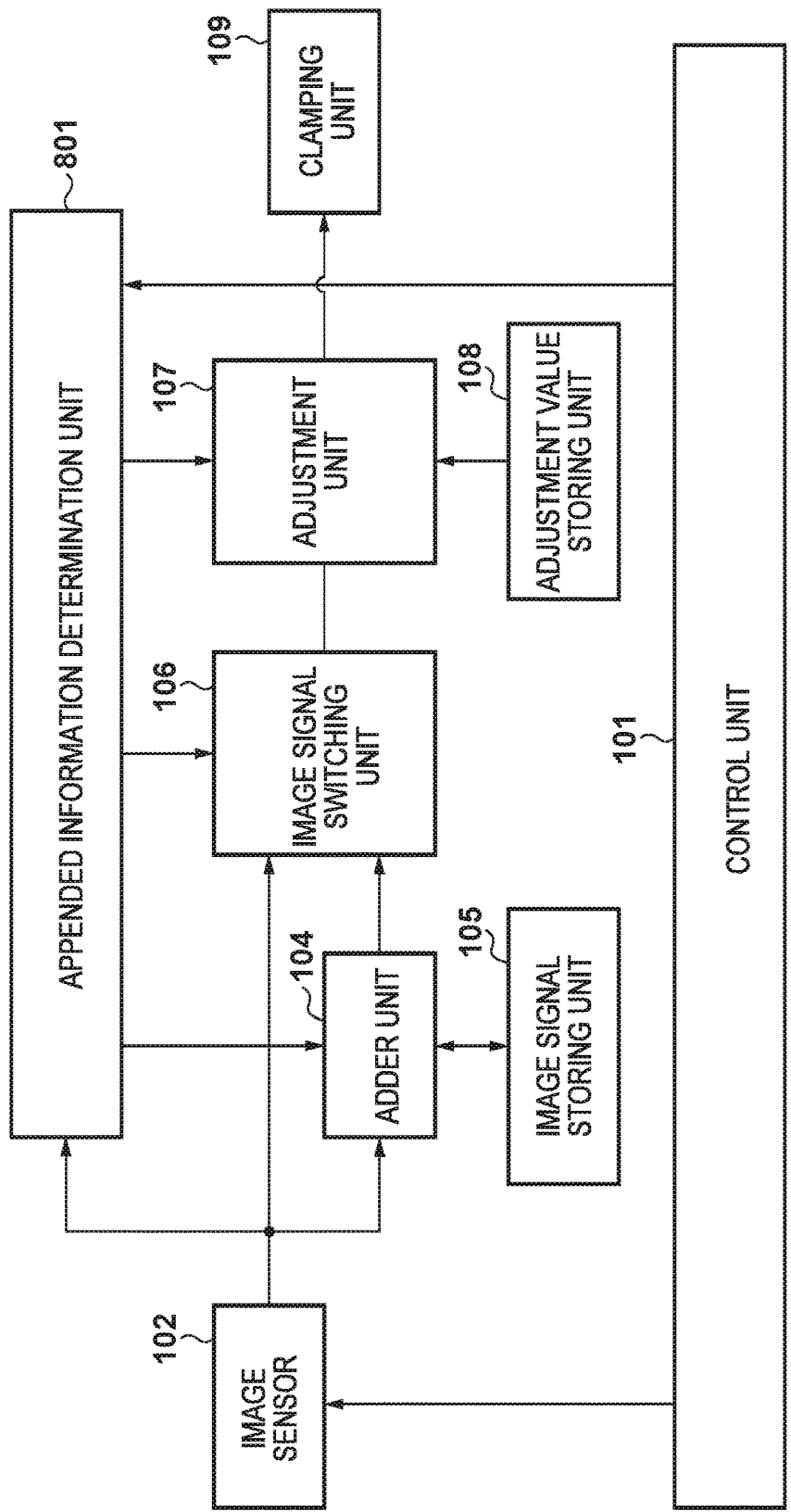
FIG. 8 is a block diagram showing a schematic configuration of an image capturing apparatus according to a second embodiment.

The second embodiment of the present invention will be described below. FIG. 8 is a block diagram showing a schematic configuration of an image capturing apparatus according to the second embodiment. The configuration shown in FIG. 8 is different in that an appended information determination unit 801 is provided in place of the determination unit 103 in FIG. 1. The other constituent elements are the same as those shown in FIG. 1, and accordingly, the same reference numerals will be assigned thereto and a description thereof will be omitted. The appended information determination unit 801 outputs an addition determination signal to the adder unit 104, the image signal switching unit 106, and the adjustment unit 107 based on appended information, which is appended to image signals output from the image sensor 102.

Figure 9:
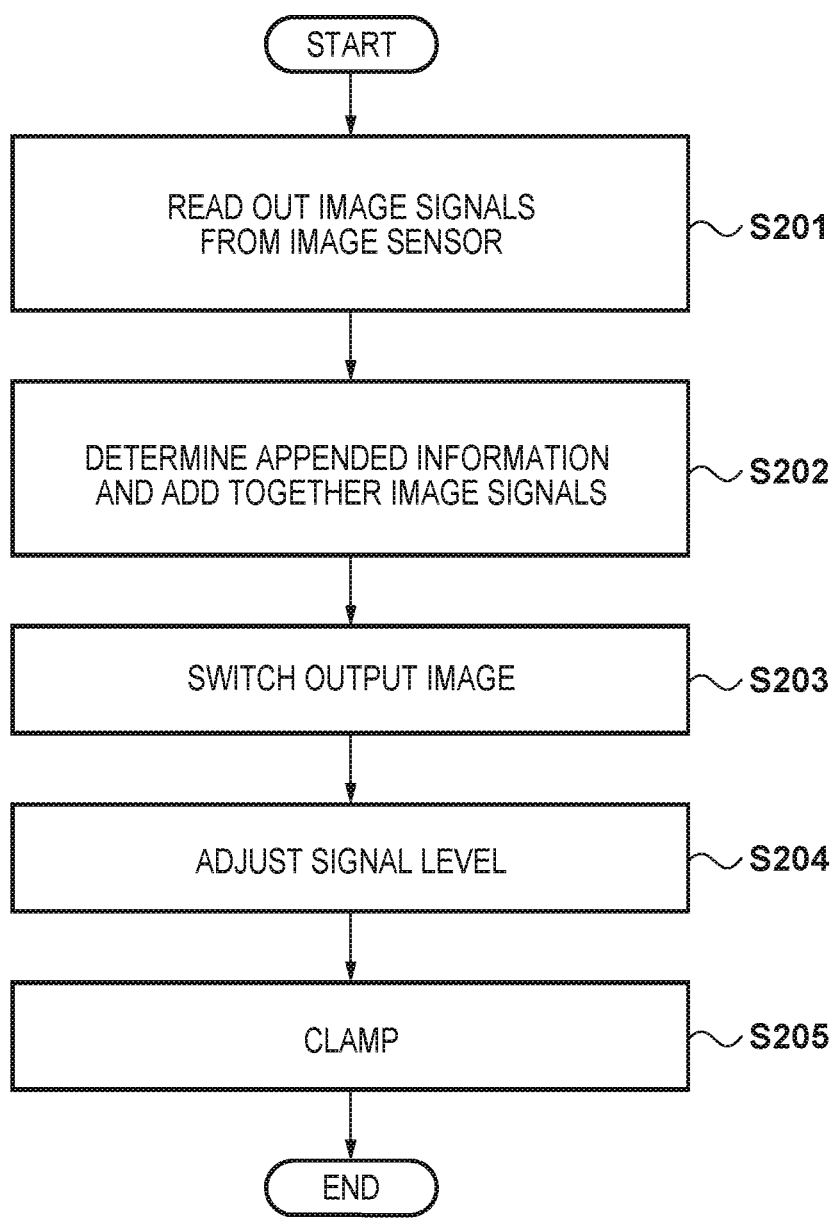
FIG. 9 is a flowchart of processing according to the second embodiment.

Processing according to the second embodiment will be described below with reference to the flowchart in FIG. 9.

Initially, in step S201, image signals are read out from the image sensor 102. Here, similar to the first embodiment, the control unit 101 transmits a control signal to the image sensor 102 row-by-row so as to read out the charges corresponding to an image formed on the photoelectric conversion portions in the image sensor 102 using the first readout method or the second readout method. The image sensor 102 reads out the charges in accordance with the control signal, and outputs the read charges as image signals. In the second embodiment, when the image signals are output, the image sensor 102 outputs appended information that indicates how each image signal has been read out from the corresponding unit pixel 201 together, for each output line. For example, an instruction in the method for reading out an image signal from each unit pixel 201 has been sent from the control unit 101 to the image sensor 102. Therefore, when an image signal is output in accordance with the instruction content, a specific value indicating the appended information is embedded in the image signal immediately before the output from a leading pixel in each line in the image sensor 102. For this reason, the image sensor 102 according to the second embodiment includes a circuit for thus embedding the appended information.

In step S202, the appended information determination unit 801 outputs, to the adder unit 104, an addition determination signal for adding together the image signals output from the image sensor 102 based on the appended information that is appended to the image signal. Here, a method for outputting the addition determination signal performed in step S202 will be described.

Figure 10:
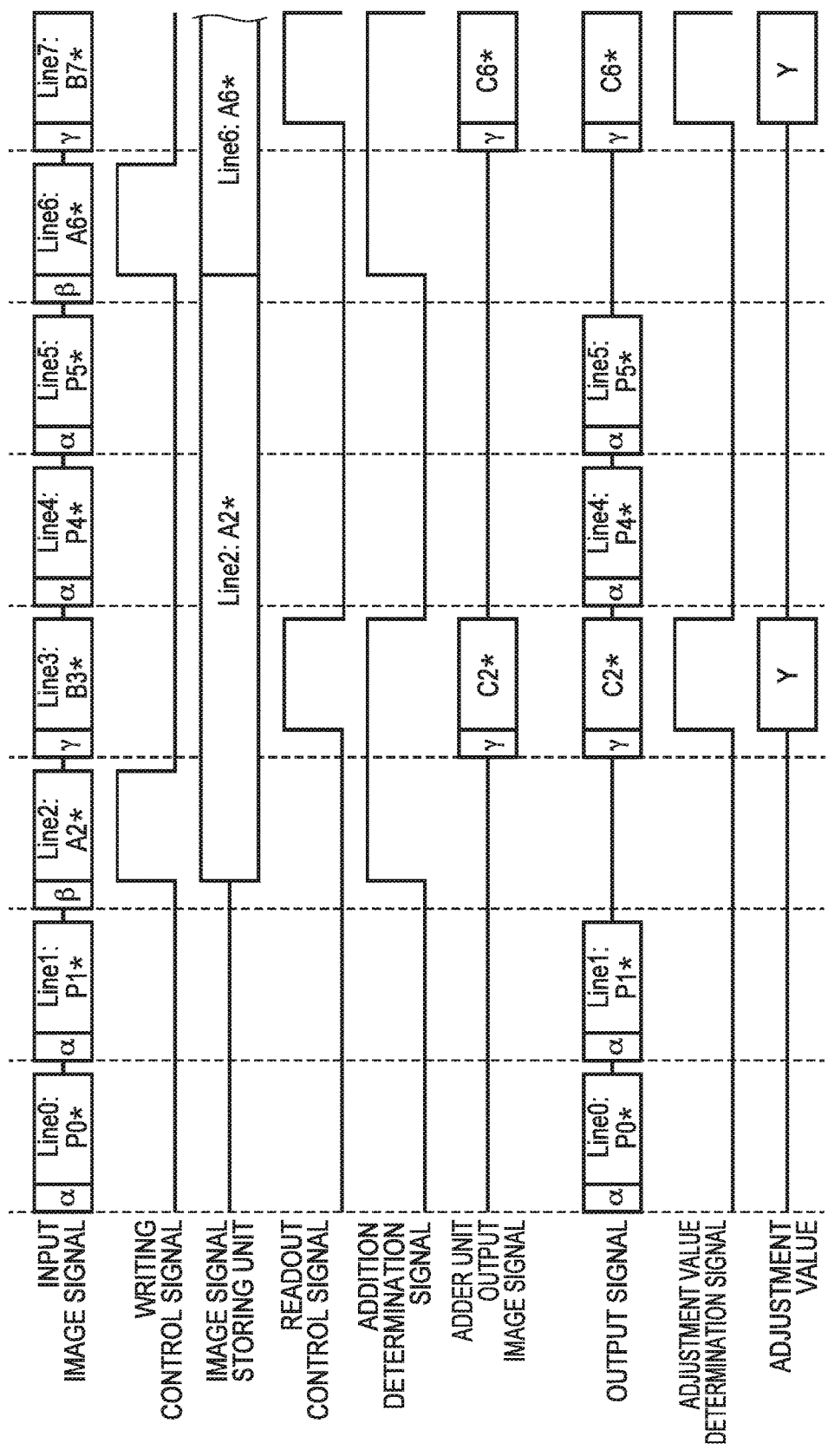
FIG. 10 is a timing chart showing timings of addition processing and switching of adjustment values according to the second embodiment.

FIG. 10 is a timing chart showing timings of addition processing and the switching of the adjustment value according to the second embodiment, and corresponds, here, to the case of reading out the signals as shown in FIG. 3, as an example. In FIG. 10, input image signals schematically indicate the appended information and the image signals in each line output from the image sensor 102, and the appended information and the image signals are repeatedly output in pairs. Appended information α indicates that the image signal has been read out using the second readout method, and is appended to Line0, Line1, Line4, and Line5. Appended information β indicates that the image signal has been read out from only the photoelectric conversion portion 203 in the unit pixel 201 using the first readout method, and is appended to Line2 and Line6. Further, appended information γ indicates that the image signal has been read out from only the photoelectric conversion portion 204 in the unit pixel 201 using the first readout method, and is appended to Line3 and Line7. The appended information determination unit 801 sets the addition determination signal to Hi while image signals from a line with the appended information β and a line with the appended information γ are input.

Signals of the image signal storing unit indicate a state where image signals for one line are stored in the image signal storing unit 105, and when the signal level of the writing control signal generated by the adder unit 104 is Hi, an input image signal at that time is stored in the image signal storing unit 105. Thus, Line2 is temporarily held in the image signal storing unit 105 in order to obtain an image signal of the unit pixel 201 by adding Line2, which includes the image signals read out from the photoelectric conversion portions 203, and Line3, which includes the image signals read out from the photoelectric conversion portions 204, together.

Next, the adder unit 104 outputs the writing control signal in order to read out the image signals in Line2 from the image signal storing unit 105 when Line3 is input. The image signals in Line2 read out from the image signal storing unit 105 are added to the image signals in Line3 by the adder unit 104. With the above processing, the adder unit 104 adds together the image signals and outputs the resultant signals. Adder unit output image signals indicate a state where the post-addition image signals are output. The adder unit 102 executes addition processing similarly for Line6 and Line7. Thus, image signals of the unit pixels 201 for the respective lines (C2* and C6* in FIG. 10) are newly obtained.

Note that, here, the writing control signal is set to Hi for lines for which the addition determination signal has been switched from Lo to Hi, and the readout control signal is set to Hi for lines for which the writing control signal has been switched from Hi to Lo.

Next, in step S203, the image signal switching unit 106 outputs image signals while switching between an image signal obtained from the image sensor 102 and an image signal obtained from the adder unit 104, based on the addition determination signal sent from the appended information determination unit 801. Thus, image signals that are necessary to record an image are output from the image signal switching unit 106.

Figure 4:
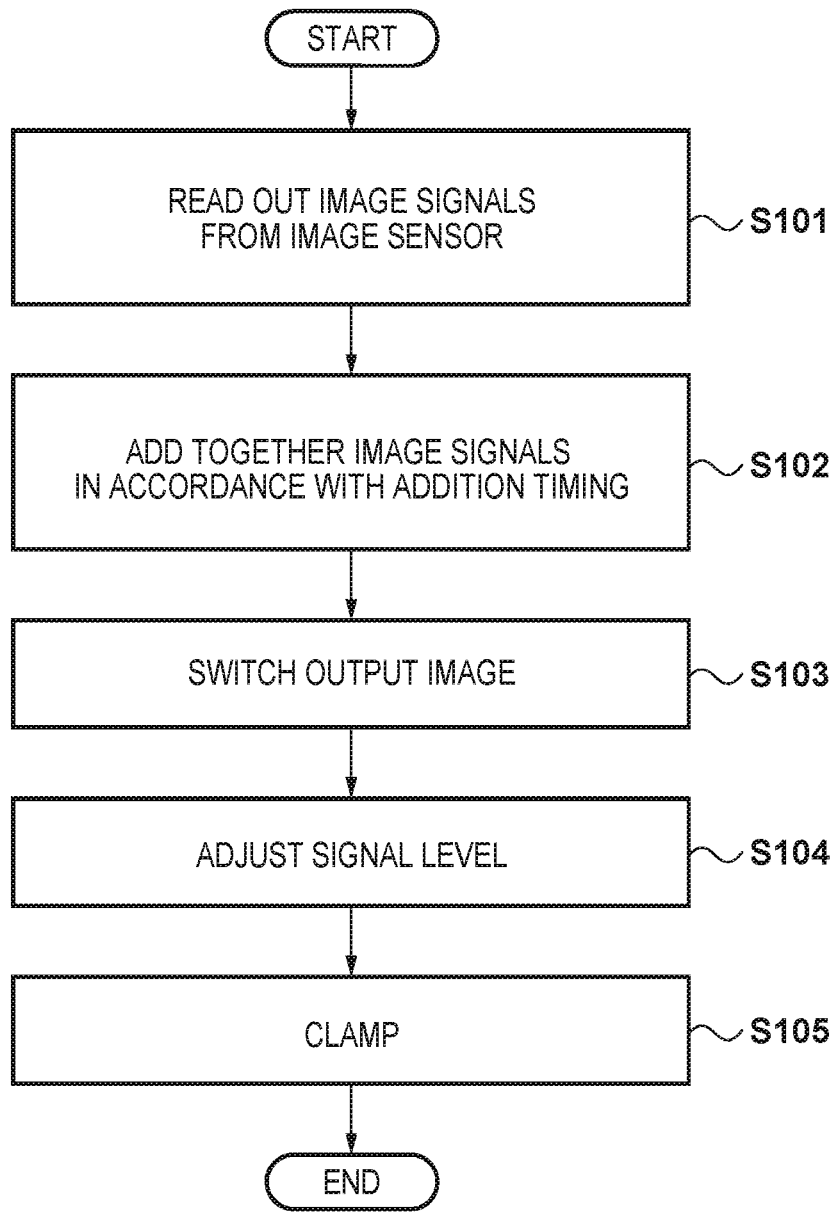
FIG. 4 is a flowchart of processing according to the first embodiment.

Processing performed in steps S204 and S205 is the same as the processing performed in steps S104 and S105 in FIG. 4 in the first embodiment, and the description thereof will be omitted here.

As described above, the second embodiment can not only achieve the same effect as the effect of the first embodiment, but also enables analysis of the appended information and switching of the adjustment value to be applied, by outputting the appended information together with each image signal from the image sensor 102. Thus, intervention of the control unit 101 can be reduced, and the complexity of control of the image capturing apparatus can be reduced.

Note that if a difference occurs in the adjustment value due to an increase in chip temperature in the image sensor 102, a compensation coefficient for the adjustment value with respect to the temperature may be stored in advance in a storing unit (not shown) in the image capturing apparatus, and the adjustment may be performed after compensating the adjustment value. In addition, more accurate correction can be made by similarly storing the adjustment value for each temperature in the storage unit (not shown) to perform the adjustment.

Although the above second embodiment has described the case of performing image signal processing in the image capturing apparatus, a configuration may also be employed in which an image signal to which the appended information is added is temporarily recorded in a recording medium or the like, and the recorded image signal is read out and processed by an image processing apparatus.

Third Embodiment

Figure 11:
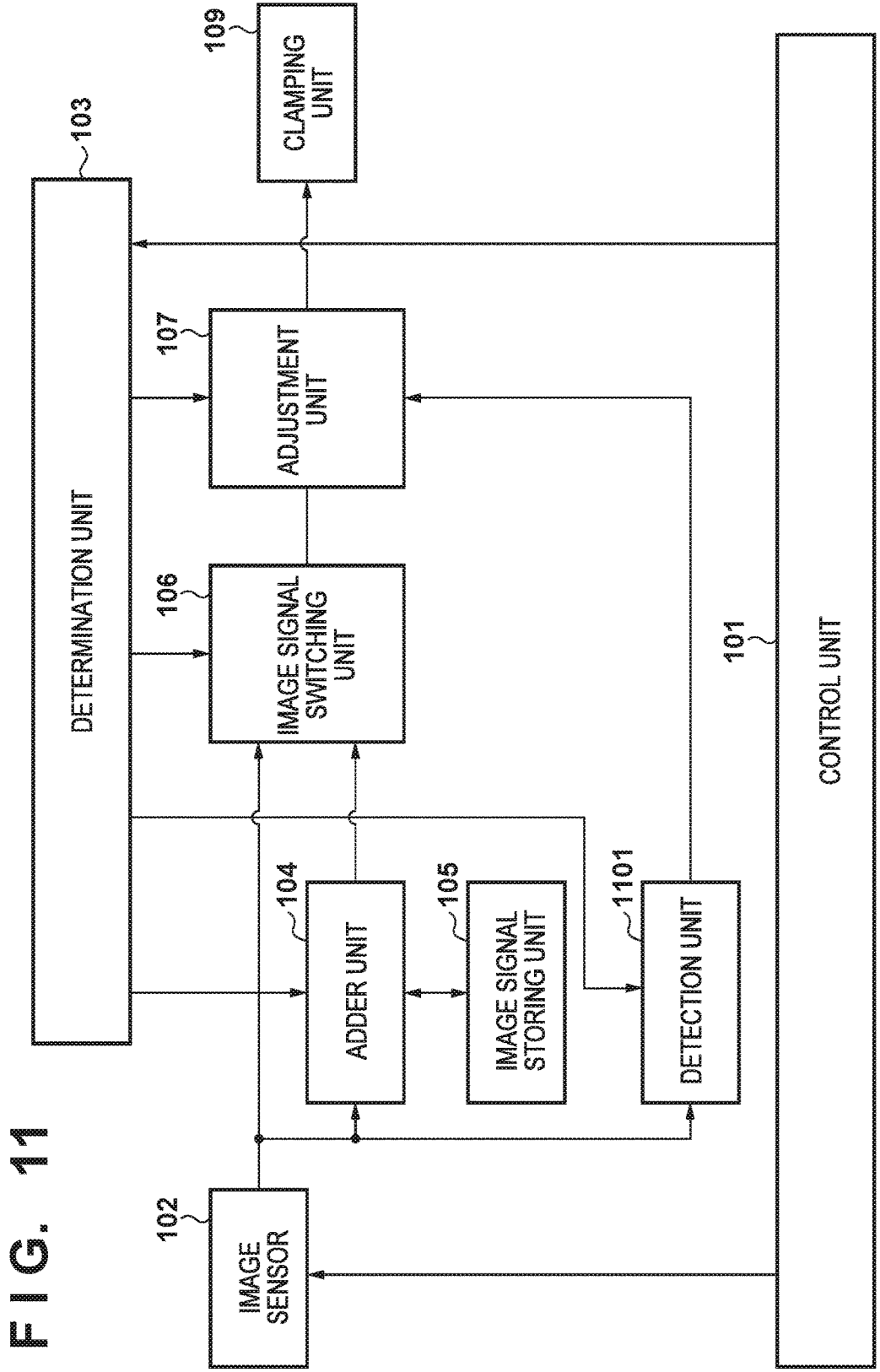
FIG. 11 is a block diagram showing a schematic configuration of an image capturing apparatus according to a third embodiment.

The third embodiment of the present invention will be described below. FIG. 11 is a block diagram showing a schematic configuration of an image capturing apparatus according to the third embodiment. Compared with the configuration of the image capturing apparatus shown in FIG. 1, the configuration shown in FIG. 11 is different in that the adjustment value storing unit 108 is not provided, and a detection unit 1101 is provided. The other constituent elements are the same as those shown in FIG. 1, and accordingly, the same reference numerals will be assigned thereto and a description thereof will be omitted. The third embodiment has a configuration in which the detection unit 1101 detects an adjustment value for adjusting the black level in an image signal output from the image sensor 102 based on a determination signal from the determination unit 10, and sends the detected adjustment value to the adjustment unit 107.

Figure 12:
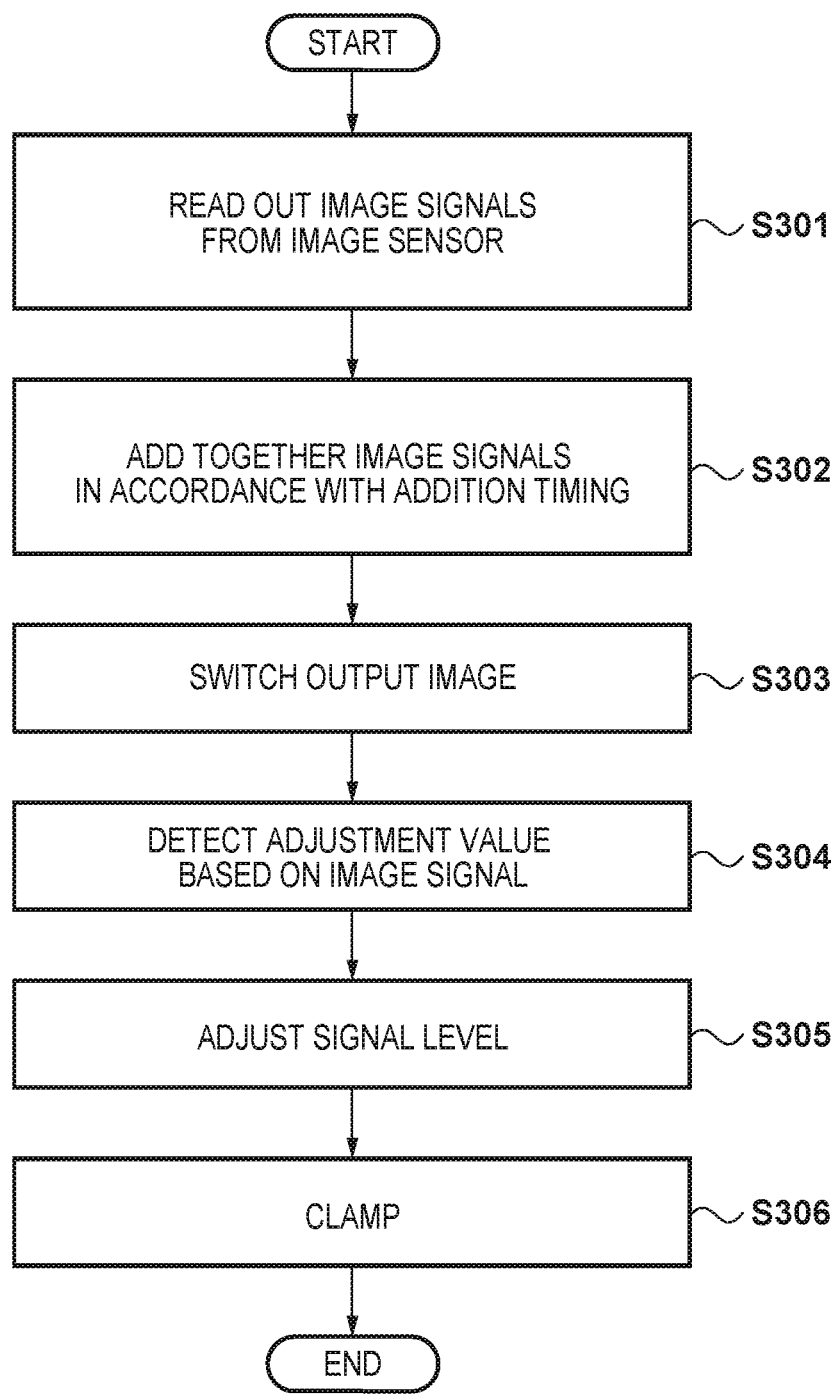
FIG. 12 is a flowchart of processing according to the third embodiment.

Processing according to the third embodiment will be described below with reference to a flowchart in FIG. 12.

Initially, in step S301, image signals are read out from the image sensor 102. Here, similar to the first embodiment, the control unit 101 transmits a control signal to the image sensor 102 row-by-row so as to read out the charges corresponding to an image formed on the photoelectric conversion portions in the image sensor 102 using the first readout method or the second readout method. The image sensor 102 reads out the charges in accordance with the control signal, and outputs the read charges as the image signals.

Next, in step S302, similar to the first embodiment, the adder unit 104 performs line addition processing using the image signal storing unit 105 on given lines of the input image signals and outputs the added image signals, based on a determination signal from the determination unit 103. Then, in step S303, similar to the first embodiment, the image signal switching unit 106 outputs image signals while switching between an image signal obtained from the image sensor 102 and an image signal obtained from the adder unit 104, based on an addition determination signal that is sent from the determination unit 103.

In step S304, the detection unit 1101 calculates the adjustment value to be used for adjusting the signal level in the adjustment unit 107, based on the image signal obtained from the image sensor 102. Processing performed in step S304 will now be described.

Figure 13:
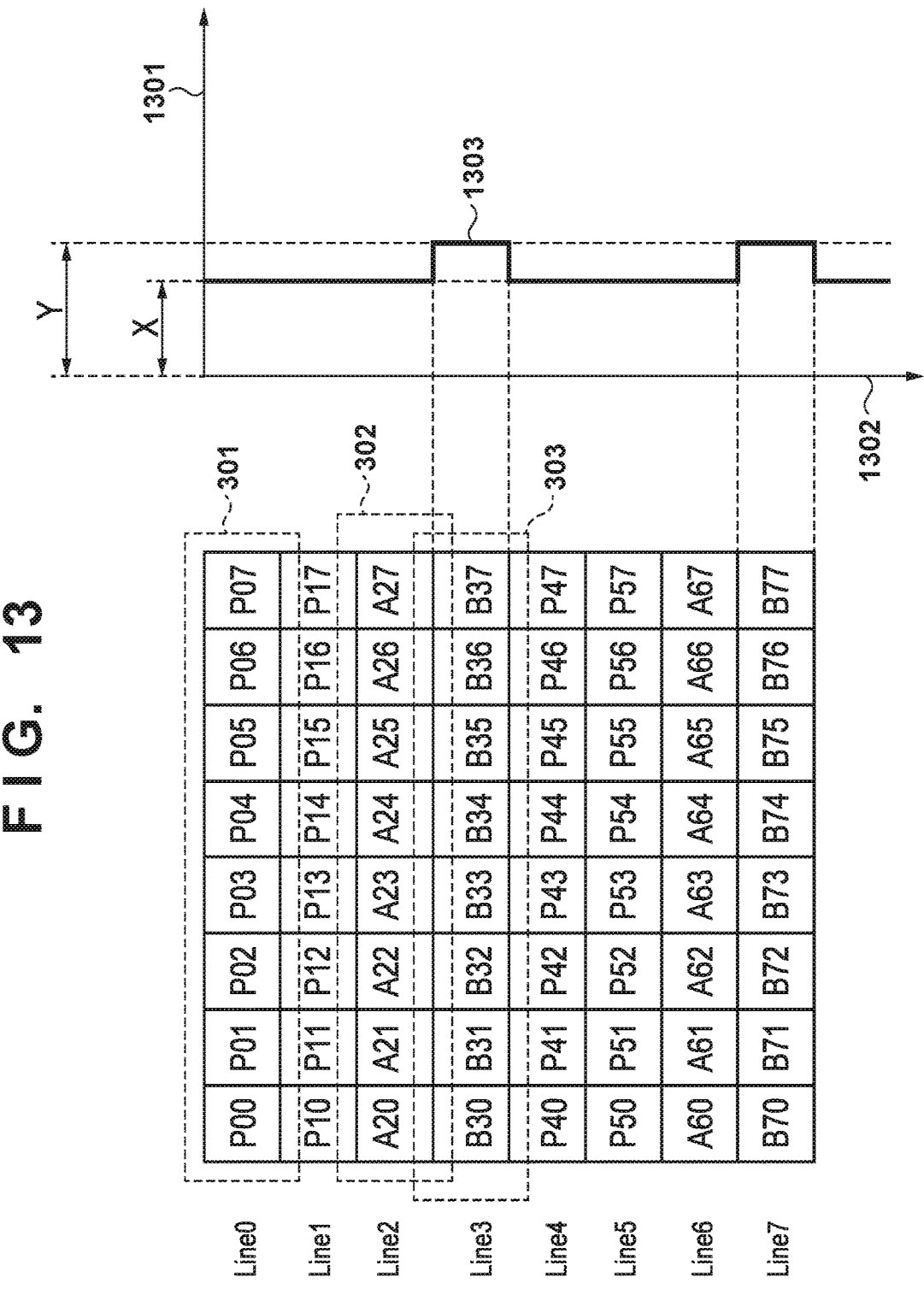
FIG. 13 is a schematic diagram showing the black level of image signals according to the third embodiment.

FIG. 13 schematically shows image signals obtained from the image sensor 102 and a state of the signal levels thereof. Note that a description of the same signs as those shown in FIG. 3 will be omitted. In FIG. 13, 1301 indicates the average signal level of the black level of each line of the obtained image signals, and 1302 indicates the line position. A difference occurs in the black level as indicated by 1303 due to a difference in driving conditions of the FD 215 in each unit pixel 201 that constitutes the image sensor 102. The detection unit 1101 calculates the signal level in the OB area for Line3 and Line7 in which the driving condition of the FD 215 is different, by means of addition and averaging processing, and sends the calculated signal level as an adjustment value Y to the adjustment unit 107.

Normally, the OB area is provided at the left or right end of each line but is susceptible to the influence of random noise since the number of pixels available for the OB area is limited, and the detected adjustment value is less accurate. For this reason, an OB area that shields the entire lines against light over a plurality of lines is provided at the upper end of an effective area of the image sensor 102, the image signals are read out from this OB area using the same readout method as that for Line3 and Line7, and the detection unit 1101 calculates the adjustment value from this image signal. With this operation, the adjustment value can be more accurately calculated.

In step S305, the adjustment value Y detected in step S304 is subtracted from the input image signal so as to subtract the black level from the image signals of the lines that have been added by the adder unit 104.

In step S306, the clamping unit 109 clamps the image signal output from the adjustment unit 107 at a target value based on the black level of the image signal. In the system of the image capturing apparatus, the code values to be used as the black level in internal calculation processing are predetermined. Therefore, the black level is detected by performing arithmetic mean processing on the image signals in the aforementioned OB area, and the signal level of the image signal is clamped so as to render the black level a target code value.

As described above, the third embodiment can not only achieve the same effect as that of the first embodiment, but also enables more accurate correction by always detecting the black level and calculating the adjustment value even in the case where, for example, a change has occurred in the adjustment value due to an increase in chip temperature in the image sensor.

Note that the above first to third embodiments have described the case where the number of photoelectric conversion portions formed in each unit pixel 201 is two. However, the present invention is not limited thereto, and may have a configuration in which each unit pixel 201 has three or more photoelectric conversion portions. In this case, the black level can be adjusted for added lines by controlling the adjustment processing in accordance with the number of lines of added image signals.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-085430, filed on Apr. 21, 2016 which is hereby incorporated by reference herein in its entirety.

What is claimed is:

1. An image capturing apparatus comprising:
an image sensor including a plurality of photoelectric conversion portions for each of a plurality of microlenses;
readout control circuitry that performs readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal;
determination circuitry that determines whether an image signal read out from the image sensor has been read out using the first readout method or the second readout method, and outputs a determination result;
an adder that adds the plurality of image signals that have been read out using the first readout method, based on the determination result provided by the determination circuitry; and
adjusting circuitry that adjusts the added image signal obtained through the addition by an increased amount of the black level that has increased due to the addition performed by the adder, as an adjustment value.

2. The image capturing apparatus according to claim 1, wherein the determination circuitry performs the determination based on the readout control performed by the readout control circuitry.

3. The image capturing apparatus according to claim 1, wherein the image sensor appends information that indicates whether the image signal has been read out using the first readout method or has been read out using the second readout method, and outputs the image signal to which the information is appended, and
the determination circuitry performs the determination based on the appended information.

4. The image capturing apparatus according to claim 1, wherein the adjusting circuitry includes a storage unit that stores the adjustment value, and performs the adjustment using the stored adjustment value.

5. The image capturing apparatus according to claim 1, wherein the adjusting circuitry changes the adjustment value in accordance with a temperature of the image sensor.

6. The image capturing apparatus according to claim 1, wherein the image sensor includes a light-shielded area, and
the image capturing apparatus further comprises detection circuitry that detects the adjustment value from an image signal that has been read out from the light-shielded area.

7. The image capturing apparatus according to claim 1, wherein the adder includes first storage circuitry for storing an image signal, stores, from among a plurality of image signals read out using the first readout method, an image signal that was read first, and adds the stored image signal to an image signal that was read second.

8. The image capturing apparatus according to claim 1, further comprising switching circuitry that outputs an image signal to the adjusting circuitry while switching between an image signal that has been read out using the second readout method and an image signal obtained through addition performed by the adder, based on the determination result provided by the determination circuitry.

9. The image capturing apparatus according to claim 1, further comprising clamping circuitry that matches the black level of an image signal that has been adjusted by the adjusting circuitry and the black level of an image signal that has been read out using the second readout method to each other.

10. A method for controlling an image capturing apparatus having an image sensor including a plurality of photoelectric conversion portions for each of a plurality of microlenses, the method comprising:
performing readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal;
determining whether an image signal read out from the image sensor has been read out using the first readout method or the second readout method, and outputting a determination result;
adding the plurality of image signals that have been read out using the first readout method, based on the determination result provided during the determining; and
adjusting the added image signal obtained through the adding by an increased amount of the black level that has increased due to the addition, as an adjustment value.

11. The control method according to claim 10, wherein, during the determining, the determination is performed based on the readout control.

12. The control method according to claim 10, wherein the image sensor appends information that indicates whether the image signal has been read out using the first readout method or has been read out using the second readout method, and outputs the image signal to which the information is appended, and
during the determining, the determination is performed based on the appended information.

13. The control method according to claim 10, wherein the image sensor includes a light-shielded area, and
the control method further comprises detecting the adjustment value from an image signal that has been read out from the light-shielded area.

14. An image processing apparatus that processes an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the image processing apparatus comprising:
determination circuitry that determines, based on information that is appended to the image signal, whether the image signal has been read out using the first readout method or has been read out using the second readout method, and outputs a determination result;
an adder that adds the plurality of image signals that have been read out using the first readout method, based on the determination result provided by the determination circuitry; and
adjusting circuitry that adjusts the added image signal obtained through the addition by an increased amount of the black level that has increased due to the addition performed by the adder, as an adjustment value.

15. An image processing method for processing an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the method comprising:
determining, based on information that is appended to the image signal, whether the image signal has been read out using the first readout method or has been read out using the second readout method, and outputting a determination result;
adding the plurality of image signals that have been read out using the first readout method, based on the determination result provided during the determining; and
adjusting the added image signal obtained through the adding by an increased amount of the black level that has increased due to the addition, as an adjustment value.

16. A non-transitory computer-readable storage medium storing a program for causing a computer to execute a method for controlling an image capturing apparatus having an image sensor including a plurality of photoelectric conversion portions for each of a plurality of microlenses, the method comprising:
performing readout control using one of a first readout method in which the plurality of photoelectric conversion portions corresponding to each of the microlenses are separated into two or more portions to read out a plurality of image signals from the image sensor, and a second readout method in which image signals of the plurality of photoelectric conversion portions corresponding to each of the microlenses are added together to read out the added image signal;
determining whether an image signal read out from the image sensor has been read out using the first readout method or the second readout method, and outputting a determination result;
adding the plurality of image signals that have been read out using the first readout method, based on the determination result provided during the determining; and
adjusting the added image signal obtained through the adding by an increased amount of the black level that has increased due to the addition as an adjustment value.

17. A non-transitory computer-readable storage medium storing a program for causing a computer to execute an image processing method for processing an image signal that has been read out from an image sensor including a plurality of photoelectric conversion portions for each of a plurality of microlenses using one of a first readout method in which the plurality of photoelectric conversion portions corresponding to each of the microlenses are separated into two or more portions to read out a plurality of image signals, and a second readout method in which image signals of the plurality of photoelectric conversion portions corresponding to each of the microlenses are added together to read out the added image signal, the method comprising:
determining, based on information that is appended to the image signal, whether the image signal has been read out using the first readout method or has been read out using the second readout method, and outputting a determination result;
adding the plurality of image signals that have been read out using the first readout method, based on the determination result provided during the determining; and
adjusting the added image signal obtained through the adding by an increased amount of the black level that has increased due to the addition, as an adjustment value.

* * * * *